United States Patent
Lin

(10) Patent No.: US 11,831,157 B1
(45) Date of Patent: Nov. 28, 2023

(54) MASTER-SLAVE COMMUNICATION SYSTEM FOR SINGLE-PHASE TO MULTI-PHASE AC POWER SUPPLY

(71) Applicant: Chyng Hong Electronic Co., Ltd., Taichung (TW)

(72) Inventor: Mu-Chun Lin, Taichung (TW)

(73) Assignee: CHYNG HONG ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 17/935,034

(22) Filed: Sep. 23, 2022

(51) Int. Cl.
*H02J 3/00* (2006.01)
(52) U.S. Cl.
CPC ..................................... *H02J 3/00* (2013.01)
(58) Field of Classification Search
CPC ........................................................ H02J 3/00
See application file for complete search history.

(56) References Cited

U.S. PATENT DOCUMENTS

2014/0049230 A1* 2/2014 Weyh ..................... H02M 7/49
323/207

* cited by examiner

*Primary Examiner* — Daniel Cavallari
(74) *Attorney, Agent, or Firm* — Sinorica International Patent & Trademark

(57) ABSTRACT

A master-slave communication system for a single-phase to multi-phase AC power supply includes a master and a plurality of slaves that are connected in parallel and configured to supply single-phase to multi-phase AC power. The master and the slaves each include a main communication control board and at least one phase communication control board. The main communication control board is in communication with the corresponding phase communication control board. The master and an adjacent one of the slaves as well as every adjacent two of the slaves are in communication with each other through a network transmission cable connected between the main communication control boards, thereby improving the communication transmission speed and reliability between the master and the slaves and further improving the output quality of the AC power supply.

6 Claims, 2 Drawing Sheets

MASTER-SLAVE COMMUNICATION SYSTEM FOR SINGLE-PHASE TO MULTI-PHASE AC POWER SUPPLY

FIELD OF THE INVENTION

The present invention relates to a power supply, and more particularly to a master-slave communication system for a single-phase to multi-phase AC power supply.

BACKGROUND OF THE INVENTION

In general, AC power supplies, such as single-phase or multi-phase AC power supplies, have been widely used in various industrial fields. If the AC power supply is composed of a single AC power supply, once a fault occurs, the entire AC power supply will lose its function. Besides, the power output by the single AC power supply cannot be expanded. Therefore, the industry adopts a redundant power system to connect multiple AC power supplies in parallel. One of the AC power supplies is set as a master and the other AC power supplies are set as slaves. The slaves and the master are connected in parallel to output power. In addition to the expansion of multiple AC power supplies connected in parallel, when one of the AC power supplies fails, the other AC power supplies can continue to perform work with high reliability. However, in a conventional communication transmission system for AC power supplies connected in parallel, the master and the slaves are connected by serial data communication interfaces, such as RS-232 or RS-485, so as to carry out master-slave communication control. In recent years, the master and the slaves are connected via a controller area network (CANbus) to perform master-slave communication control of the AC power supplies. In the conventional communication transmission system, whether the master and the slaves are connected by serial data communication interfaces, such as RS-232 or RS-485, or the master and the slaves are connected via a controller area network, when the master-slave control is performed, the transmission speed of the control signal is very slow. The transmission speed of the signal is less than 1Mbit, so that the master-slave control between the master and the slaves cannot respond immediately. In order to provide serial data communication interfaces, such as RS-232 or RS-485, or a controller area network, the master and the slaves need to be configured with various serial busbars and signal transmission jacks. As a result, there are many connection structures between the master and the slaves, and the wiring is complicated. After the slaves and the master are connected in parallel, the parallel connection between the master and the slaves is to connect the respective slaves directly to the master. Therefore, the wiring is complicated, and the total length of the communication transmission cable is too long. It is easy to reduce the reliability of the communication signal transmission in the transmission process, resulting in a decrease in the output quality of the power supply. Accordingly, the inventor of the present invention has devoted himself based on his many years of practical experiences to solve these problems.

SUMMARY OF THE INVENTION

The primary object of the present invention is to provide a master-slave communication system for a single-phase to multi-phase AC power supply, which can increase the signal transmission speed greatly. When the master and the slaves perform master-slave communication transmission, the slaves can respond immediately and act synchronously with the master to ensure the output quality of the AC power supply.

In order to achieve the above object, the present invention provides a master-slave communication system for a single-phase to multi-phase AC power supply, comprising a master and a plurality of slaves. The master is configured to supply single-phase to multi-phase AC power. The master includes a main communication control board and at least one phase communication control board according to the number of phases of the output AC power. The main communication control board is in communication with the phase communication control board. The slaves are also configured to supply single-phase to multi-phase AC power. The slaves and the master are connected in parallel. The slaves each include a main communication control board and at least one phase communication control board corresponding to the master. The main communication control board is in communication with the phase communication control board. The master and an adjacent one of the slaves as well as every adjacent two of the slaves are in communication with each other through a network transmission cable connected between the main communication control boards.

The network communication interface formed by the master and the slaves that are connected in parallel can make the transmission of signals more smooth. When the master and the slaves perform master-slave communication transmission, the slaves can respond immediately and act synchronously with the master to ensure the output quality of the AC power supply.

DETAILED DESCRIPTION OF THE PREFERRED EMBODIMENTS

Figure 1:
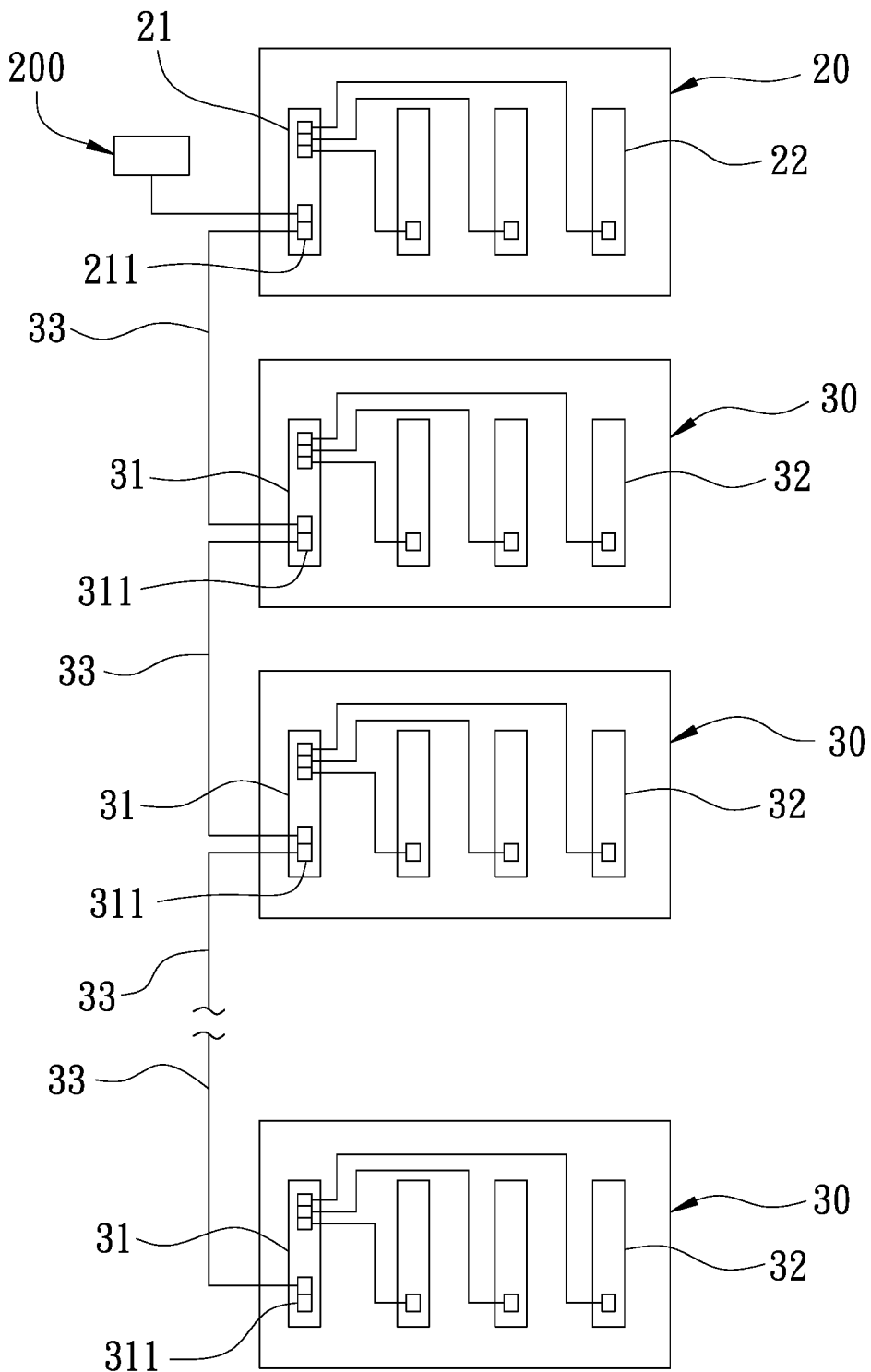
FIG. 1 is a block diagram of a master and slaves that are connected in parallel according to a first embodiment of the present invention when being applied to a three-phase AC power supply.

FIG. 1 is a block diagram of a master and slaves that are connected in parallel according to a first embodiment of the present invention. The present discloses a master-slave communication system for a single-phase to multi-phase AC power supply, comprising a master 20 and a plurality of slaves 30.

The master 20 is configured to supply single-phase to multi-phase AC power. The master 20 includes a main communication control board 21 and at least one phase communication control board 22 according to the number of phases of the output AC power, as communication control of the power module of each phase. In this embodiment, the master 20 outputs three-phase AC power, so the master 20 includes three phase communication control boards 22. The main communication control board 21 is in communication with the phase communication control boards 22. A network connection port 211 is disposed on the main communication control board 21. The network connection port 211 is one of ports used for fiber-optic cables and network cables, but not limited thereto. The master 20 can input and output signals through the network connection port 211. The network connection port 211 conforms to the LXI (LAN eXtensions for Instrumentation). The main communication control board 21 of the master may be connected to a control unit 200 through the network connection port 211. The master 20 is controlled by the control unit 200. The control unit 200 may be one of a computer (PC) and a programmable logic controller (PLC).

The slaves 30 are also configured to supply single-phase to multi-phase AC power. The slaves 30 and the master 20 are arranged in sequence and are connected in parallel. Each slave 30 includes a main communication control board 31 and at least one phase communication control board 32 corresponding to the master 20. In this embodiment, the slaves 30 also output three-phase AC power, like the master 20, so each slave 30 includes three phase communication control boards 32. Each phase communication control board 32 is in communication with the main communication control board 31. A network connection port 311 is disposed on the main communication control board 31 of each of the slaves 30. The network connection port 311 corresponds to the network connection port 211 of the master 20. The network connection port 311 is one of ports used for fiber-optic cables and network cables, but not limited thereto. The master 20 and an adjacent one of the slaves 30 as well as every adjacent two of the slaves are in communication with each other through a network transmission cable 33 connected between the network connection ports 211, 311. The network transmission cable 33 corresponds to the network connection ports 211, 311 and may be a fiber-optic cable or a network cable, but not limited thereto.

In order to further understand the structural features, the technical means and the expected effects of the present invention, the present invention is described in more detail.

1. When the signal of each phase of the master 20 and the slaves 30 is to be transmitted to the control unit 200, the signal of each phase of the slaves 30 is firstly transmitted from the phase communication control board 32 to the master communication control board 31 of the corresponding slave 30, and then is sequentially transmitted to the master communication control board 21 of the master 20 through the respective network transmission cables 33 of the slaves 30. Finally, the signal of each phase of the slaves 30 and the signal of the phase communication control board 22 of the master 20 are aggregated by the master communication control board 21 of the master 20, and then jointly transmitted to the control unit 200 through the master communication control board 21 of the master 20. The reverse is also true. In addition to shortening the length of the network transmission cables between the master 20 and the slaves 30, the network communication interface formed by the connection of the master 20 and the slaves 30 makes the transmission of signals more smooth.

2. In the present invention, the master and the slaves are connected in parallel by adopting a network or a fiber-optic network to form a local area network (LAN). The signal transmission speed can reach 10/100/1000Mbps, so the transmission speed of each phase can be accelerated, and the control signal can be transmitted quickly. When the master 20 and the slaves 30 perform master-slave communication transmission, the slaves 30 can respond immediately and act synchronously with the master 20 to ensure the output quality of the AC power supply.

3. In the present invention, the power required by the load is outputted by multiple AC power supplies connected in parallel in a master-slave manner, so the number of the slaves can be adjusted according to the power required by the load. The present invention has the advantage that it can be expanded as desired. In addition, when one of the AC power supplies fails, the other AC power supplies can continue to output power, having the advantage of a redundant power system. The power output is not interrupted, not shut down, and has high reliability.

Figure 2:
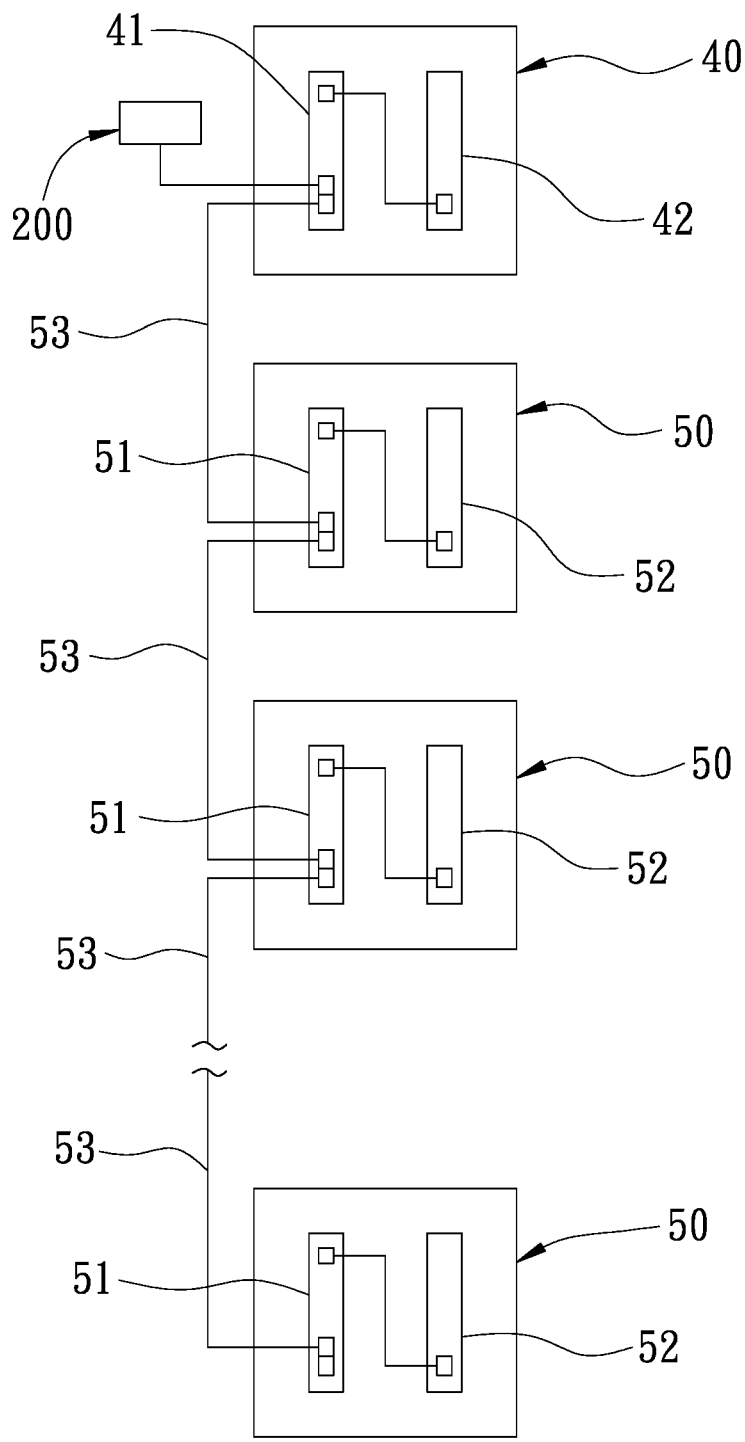
FIG. 2 is a block diagram of a master and slaves that are connected in parallel according to a second embodiment of the present invention when being applied to a single-phase AC power supply.

FIG. 2 illustrates another embodiment of the present invention. In this embodiment, the master 40 and the slaves 50 are configured to output single-phase AC power. The master 40 has a master communication control board 41 and a phase communication control board 42. The slaves 50 each have a master communication control board 51 and a phase communication control board 52. The main communication control board 41 of the master 40 is in communication with the phase communication control board 42 of the master 40. The main communication control board 51 of the slave is in communication with the phase communication control board 52 of the slave 50. The master 40 and an adjacent one of the slaves 50 as well as every adjacent two of the slaves 50 are in communication with each other through a network transmission cable 53 connected between the main communication control boards 41, 51, so that the master 40 and the slaves 50 can perform master-slave communication transmission.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A master-slave communication system for a single-phase to multi-phase AC power supply, comprising:
   a master, configured to supply single-phase to multi-phase AC power, the master including a main communication control board and at least one phase communication control board according to the number of phases of the output AC power, the main communication control board being in communication with the phase communication control board;
   a plurality of slaves, configured to supply single-phase to multi-phase AC power, the slaves and the master being connected in parallel, the slaves each including a main communication control board and at least one phase communication control board corresponding to the master, the main communication control board being in communication with the phase communication control board, the master and an adjacent one of the slaves as well as every adjacent two of the slaves being in communication with each other through a network transmission cable connected between the main communication control boards for the master and the slaves to perform master-slave communication transmission.

2. The master-slave communication system as claimed in claim 1, wherein the master and the slaves output three-phase AC power, the master includes three phase communication control boards, and the slaves each include three phase communication control boards.

3. The master-slave communication system as claimed in claim 1, wherein a network connection port is disposed on the main communication control board of the master, a network connection port is disposed on the main communication control board of each of the slaves, the master and an adjacent one of the slaves as well as every adjacent two of the slaves are in communication with each other through a network transmission cable connected between the network connection ports, and the master performs communication transmission of signals aggregated by the master and the slaves through the network connection ports.

4. The master-slave communication system as claimed in claim 1, wherein the network connection port of the master is in communication with an external control unit.

5. The master-slave communication system as claimed in claim 4, wherein the control unit is one of a computer and a programmable logic controller.

6. The master-slave communication system as claimed in claim 1, wherein the network transmission cable is one of a fiber-optic cable and a network cable.

* * * * *